3,150,145
CHLOROALKENYL THIOPYRIDINE OXIDES

Herbert L. Rawlings, Scott Depot, and John J. D'Amico, Charleston, W. Va., assignors to Monsanto Company, a corporation of Delaware
No Drawing. Filed May 1, 1959, Ser. No. 810,225
5 Claims. (Cl. 260—294.8)

This invention relates to a class of alkenyl thiopyridine oxides, to herbicidal compositions containing the new compounds as an essential ingredient and to methods employing such compositions for controlling vegetation.

According to the invention there are provided pyridine oxides having the formula

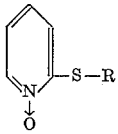

in which R represents a lower alkenyl group, preferably halogen substituted lower alkenyl. They are prepared by condensing the sodium salt of 2-pyridinethiol, 1-oxide with the corresponding unsaturated halide. Suitable reactants comprise allyl chloride, methallyl chloride, cis-1,2,3-trichloro-2-butene, trans-1,2,3-trichloro-2-butene, 1,3-dichloro-2-butene, 2,3-dichloro-1-propene, 2,3-dibromo-1-propene, 1,3-dichloropropene, 1-chloro-3-iodo-2-propene, 1,3-diiodo-2-butene, 2,3-diiodo-2-butene, 3-bromo-1-chloro-2-fluoro-1-propene, cis-1,2,3-trichloro-1-propene, trans-1,2,3-trichloro-1-propene, 1,4-dibromo-2,3-dichloro-2-butene, 1,2,3,3-tetrachloropropene and 2,3,3-trichloro-1-butene. The last readily undergoes an allylic rearrangement and is therefore equivalent to 1,2,3-trichloro-2-butene.

The following examples illustrate in detail the preparation and properties of some of the new products but are not intended as a limitation of the invention.

EXAMPLE 1

To a stirred solution of 30 grams (0.2 mole) of the sodium salt of 2-thiopyridine, 1-oxide in 100 ml. of water was added in one portion 22.2 grams (0.2 mole) of 2,3-dichloro-1-propene and the mixture heated at 50–60° C. for 24 hours. After cooling to 10° C., 300 ml. of ether were added and stirring continued for 15 minutes at 5–10° C. The precipitate which formed was filtered and air dried at room temperature. After recrystallization from ethyl alcohol, the 2-(2-chloroallylthio)-pyridine, 1-oxide was obtained as a tan solid, M.P. 114–115° C. Analysis gave 7.4% nitrogen, 15.6% sulfur and 17.6% chlorine as compared to 7.0% nitrogen, 15.9% sulfur and 17.6% chlorine calculated for $C_8H_8ClNOS$.

EXAMPLE 2

In this example 2-bromo-3-chloro-1-propene was used in place of 2,3-dichloro-1-propene. The mixture was heated at 50–60° C. for 5 hours, then cooled to 10° C. and 500 ml. of ether added. Stirring was continued at 0–10° C. for 30 minutes. The precipitate which formed was filtered, washed with water until neutral to litmus and air dried at room temperature. After recrystallization from ethyl alcohol the 2-(2-bromoallylthio)-pyridine, 1-oxide was obtained as a tan solid, M.P. 122–123° C. Analysis gave 5.3% nitrogen and 13.3% sulfur as compared to 5.7% nitrogen and 13.0% sulfur calculated for $C_8H_8BrNOS$.

EXAMPLE 3

To 30 grams (0.2 mole) of the sodium salt of 2-thiopyridine, 1-oxide in 100 ml. of water was added in one portion with stirring 22.2 grams (0.2 mole) of 1,3-dichloropropene and the mixture heated at 50–60° C. for 24 hours. After cooling to 25° C., 300 ml. of ether was added and the solution stirred for one hour. The ether and aqueous layer were then decanted and the bottom oily layer placed in vacuo at a maximum temperature of 80–90° C. at 1–2 mm. The 2-(3-chloroallylthio)pyridine, 1-oxide thus obtained was an amber oil analyzing 6.5% nitrogen and 15.2% sulfur as compared to 6.9% nitrogen and 15.9% sulfur calculated for $C_8H_8ClNOS$.

EXAMPLE 4

In the procedure of Example 3, 1,1,3-trichloropropene was substituted for the 1,3-dichloropropene. The 2-(3,3-dichloroallylthio)pyridine, 1-oxide was a dark amber oil analyzing 13.4% sulfur as compared to 13.6% calculated for $C_8H_7Cl_2NOS$.

EXAMPLE 5

Substitution of cis- and trans-1,2,3-trichloropropene in this example gave 2-(cis- and trans-2,3-dichloroallylthio)-pyridine, 1-oxide as a dark amber oil which became a semi-solid on standing. Analysis gave 5.8% nitrogen and 13.7% sulfur as compared to 5.9% nitrogen and 13.6% sulfur calculated for $C_8H_7Cl_2NOS$.

The new compounds of this invention have general herbicidal properties but are particularly effective as pre-emergent herbicides in a wide range of crops and weed species. The method of controlling vegetation, according to this invention, comprises applying thereto a toxic concentration of the above-defined alkenyl thiopyridine oxides. By applying the toxicants to vegetation is meant any means whereby the toxicant is brought into contact with living plants. The toxicant may be applied conveniently in the form of a spray containing the active ingredient in a concentration within the range of 0.1%–10.0% by weight. Thorough coverage of the foliage is effective for contact killing. For pre-emergence control amounts within the range of ½–60 pounds per acre have been used successfully.

In general, in the application of these compounds, aqueous dispersions or aqueous solutions depending on whether or not the compound is water soluble, will be found most desirable. The dispersions will of course contain a dispersing or wetting agent and the solutions also preferably contain wetting agents to facilitate the spreading of the solution. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts or sulfated fatty alcohols, ethylene oxide condensation products of alkyl phenols or tall oil and other dispersing and wetting agents.

The tables below illustrate characteristic herbicidal activity of the compounds of this invention. The toxicant was emulsified in water and the emulsion applied as a spray. In the pre-emergence tests the spray was applied to the ground of seeded plots before the grass or other plants emerged. The alkenyl thiopyridine oxide was applied at the rate of 25 pounds per acre and the phytotoxicity observed. In the foliage tests the spray containing the concentration of the active ingredient shown in the table was applied to the foliage of grass and to the foliage of bean plants and finally to the foliage of a mixture of broad-leaved plants and the effect recorded. The following phytotoxicity rating key was used:

|  | Contact | Pre-emergence |
|---|---|---|
| No phytotoxicity | 0 | 0 |
| Slight phytotoxicity | 1 | 1 |
| Moderate phytotoxicity | 2 | 2 |
| Severe phytotoxicity | 3 | 3 |
| Defoliation | B | |

The plants employed in the pre-emergence tests are designated by letter in Table I. The plants corresponding to the letters are as follows:

A—Morning glory
B—Wild oats
C—Brome grass
D—Rye grass
E—Radish-mustard
F—Sugar-beet
G—Cotton
H—Corn
J—Foxtail
K—Barnyard grass
L—Crab grass
M—Pigweed
N—Wild buckwheat
O—Tomato
P—Sorghum

*Table I*

PRE-EMERGENCE

| Compound | Phytotoxicity rating |||||||||||||||
|---|---|---|---|---|---|---|---|---|---|---|---|---|---|---|---|
| | A | B | C | D | E | F | G | H | J | K | L | M | N | O | P |
| Product of Example 1 | 0 | 3 | 3 | 3 | 0 | 2 | 0 | 3 | 3 | 2 | 3 | 3 | | | |
| Product of Example 2 | 0 | 3 | 2 | 3 | 0 | 1 | 1 | 3 | 3 | 1 | 3 | 1 | | | |
| Product of Example 3 | 0 | 1 | 2 | 3 | 0 | 2 | | | | 2 | 3 | 3 | 0 | 2 | 2 |
| Product of Example 4 | 3 | 3 | | 3 | 1 | 3 | | | | 3 | 3 | 3 | 1 | 0 | 3 |
| Product of Example 5 | 2 | 3 | | 3 | 1 | 3 | | | | 3 | 3 | 3 | 3 | 2 | 3 |
| Product of Example 6 | 0 | 1 | 1 | 2 | 2 | 3 | 2 | 2 | 3 | 3 | 3 | 3 | | | |

*Table II*

CONTACT

| Active ingredient | Conc., percent | Phytotoxicity rating |||
|---|---|---|---|---|
| | | Grass | Bean | Broadleaf |
| Product of Example 1 | 0.5 | 1 | 3 | 3 |
| | 0.2 | 1 | 1 | 2 |
| Product of Example 2 | 0.5 | 1 | 2 | 2 |
| Product of Example 3 | 0.5 | 1 | 3 | 2 |
| | 0.2 | 0 | 2 | 0 |
| Product of Example 4 | 0.5 | 2 | 3 | 3 |
| | 0.2 | 0 | 3B | 2 |
| Product of Example 5 | 0.5 | 1 | 3 | 3 |
| | 0.2 | 0 | 3 | 2 |
| Product of Example 6 | 0.5 | 1 | 3 | 3 |
| | 0.2 | 1 | 2 | 2 |

Employed at lower concentrations the herbicidal compositions of this invention may be applied to crop plants to give substantially complete control of certain weeds without harming the crop plants. In applying the herbicidal compositions for selective weed control, the applications are preferably of the pre-emergence type. At a concentration of 5 pounds per acre, for example, the compositions show a highly selective action against crab grass and pigweed in the presence of such common crops as radish, corn and cotton.

These compounds are also excellent fungicides. They control cereal rusts against which they function as eradicants. In view of the low toxicity to grasses application to the foliage is feasible. Moreover, only low concentrations are needed. The compounds described herein eradicated wheat rust (*Puccinia rubigo-vera tritici*) at concentrations within the range of 500–2500 parts per million. Aqueous dispersions of the toxicants within the aforesaid concentration were applied to wheat plants four days after infection with the fungus. After a week the plants were examined and graded as to number and size of pustules formed on the leaves. Fair to excellent control was observed.

It is intended to cover all changes and modifications of the examples of the invention herein chosen for purposes of disclosure which do not constitute departures from the spirit and scope of the invention.

What is claimed is:

1. A compound of the formula

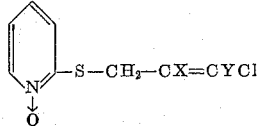

where X and Y are selected from a group consisting of hydrogen and chlorine.

2. 2-(2,3,3-trichloroallylthio)pyridine, 1-oxide.
3. 2-(3-chloroallylthio)pyridine, 1-oxide.
4. 2-(3,3-dichloroallylthio)pyridine, 1-oxide.
5. 2-(2,3-dichloroallylthio)pyridine, 1-oxide.

References Cited in the file of this patent

UNITED STATES PATENTS

| | | |
|---|---|---|
| 2,679,453 | Brett et al. | May 25, 1954 |
| 2,826,585 | Cislak | Mar. 11, 1958 |
| 2,826,586 | Cislak | Mar. 11, 1958 |
| 2,875,031 | Kruckenberg et al. | Feb. 24, 1959 |